United States Patent
Ishii (10) Patent No.: US 6,185,014 B1
(45) Date of Patent: Feb. 6, 2001

(54) MULTI-COLOR IMAGE FORMING METHOD AND APPARATUS

(75) Inventor: Akira Ishii, Kanagawa (JP)

(73) Assignee: Fuji Xerox Co., LTD, Tokyo (JP)

( * ) Notice: Under 35 U.S.C. 154(b), the term of this patent shall be extended for 659 days.

(21) Appl. No.: 08/498,570

(22) Filed: Jul. 6, 1995

(30) Foreign Application Priority Data

Jul. 7, 1994 (JP) .................................................. 6-156143

(51) Int. Cl.[7] .................................................. H04N 1/40
(52) U.S. Cl. .......................................................... 358/536
(58) Field of Search .................................. 358/296, 298, 358/533, 518, 530, 534, 536

(56) References Cited

U.S. PATENT DOCUMENTS 5,469,266 * 11/1995 Usami et al. ........................ 358/298

FOREIGN PATENT DOCUMENTS 4-105962   7/1992   (JP) .................................. H04N/1/29

* cited by examiner

*Primary Examiner*—Jerome Grant, II
(74) *Attorney, Agent, or Firm*—Finnegan, Henderson, Farabow, Garrett & Dunner, L.L.P.

(57) ABSTRACT

An analog color image signal sent from a D/A converter is compared with a triangular-wave signal generated by a triangular-wave generator, to produce a pulse-width modulation signal serving as a dot signal. The phase of a clock signal supplied to the triangular-wave generator is shifted on a line-by-line basis to produce a screen angle of each color so that the initial phases become different from one another for the respective colors.

5 Claims, 12 Drawing Sheets

FIG. 1

FIG. 2 (a) PIXEL CLOCK SIGNAL

FIG. 2 (b) DOT REFERENCE CLOCK SIGNAL

MULTI-COLOR IMAGE FORMING METHOD AND APPARATUS

BACKGROUND OF THE INVENTION

The present invention relates to a multi-color image forming apparatus such as an electrophotographic color printer/copier for forming a color image by superimposing images of a plurality of colors one on another and, more specifically, to such a multi-color image forming apparatus capable of producing high-quality color images by reducing the degree of a moiré phenomenon that may occur when the respective colors are given different screen angles.

To reproduce halftone images, electrophotographic printers/copiers, for instance, employ a dot printing technique in which multi-gradation densities are reproduced in an equivalent manner by varying areas of respective dots. To perform dot printing, an electronically generated screen is generally used. In electrophotographic color printers/copiers that form color images by superimposing images of a plurality of colors one on another, screens are set for the respective colors. In this case, to avoid physical superimposition of dots of the respective colors, the screen angles of the respective colors are made different from each other; that is, screen rotation is effected.

Figure 7:
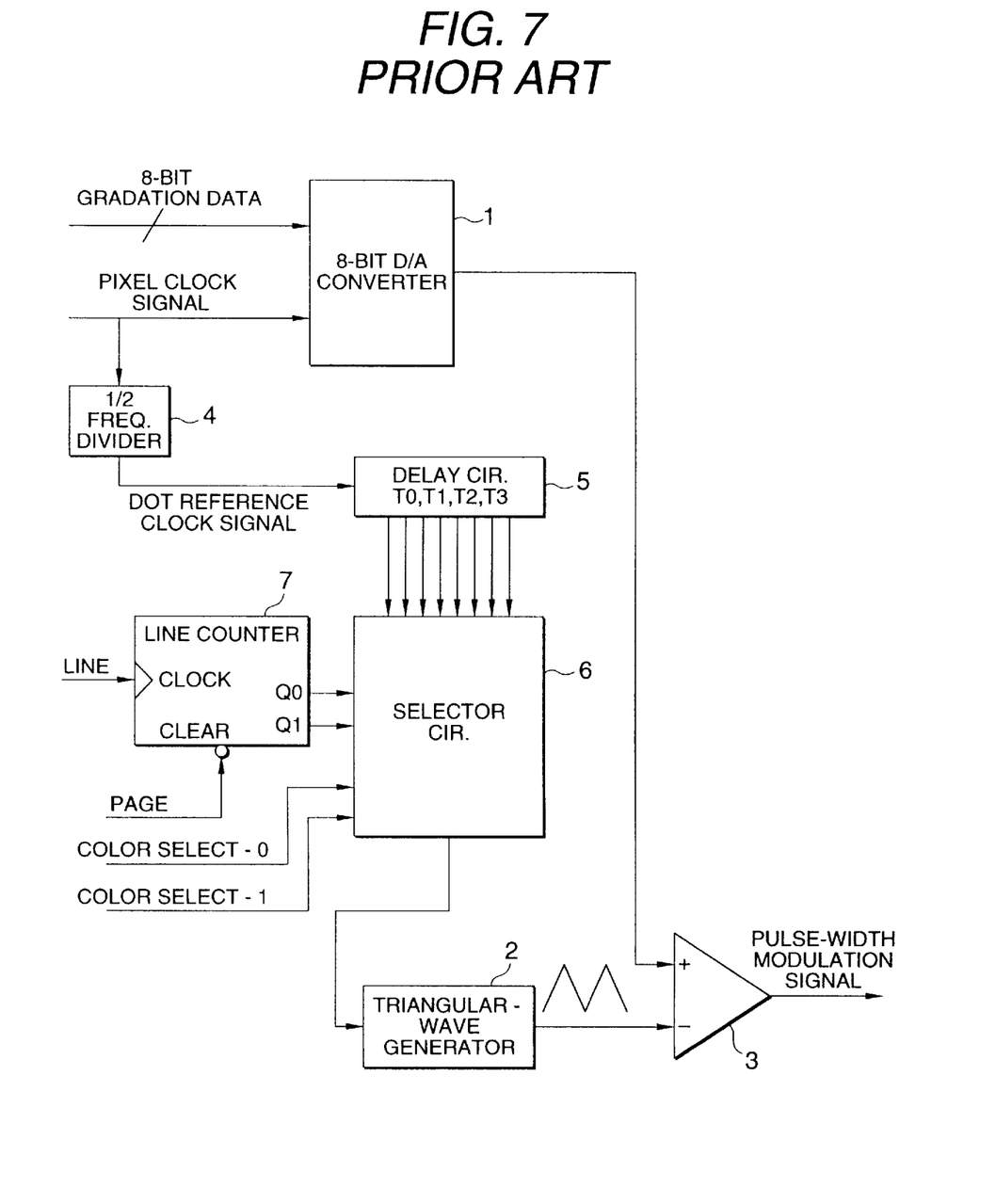
FIG. 7 is a block diagram showing a conventional multi-color image forming apparatus.

FIG. 7 shows a conventional technique of effecting screen rotation in an electrophotographic color printer/copier.

In the example of FIG. 7, 8-bit digital image data is converted to an analog signal by a D/A converter 1 at clock timings of a pixel clock signal. A comparator 3 compares the resulting analog signal with a triangular-wave signal having a predetermined period that is supplied from a triangular-wave generator 2, so that a pulse-width modulation signal is generated whose width depends on the level of the analog signal. The pulse-width modulation signal serves as a dot signal to be used for generating dots.

Figure 8:
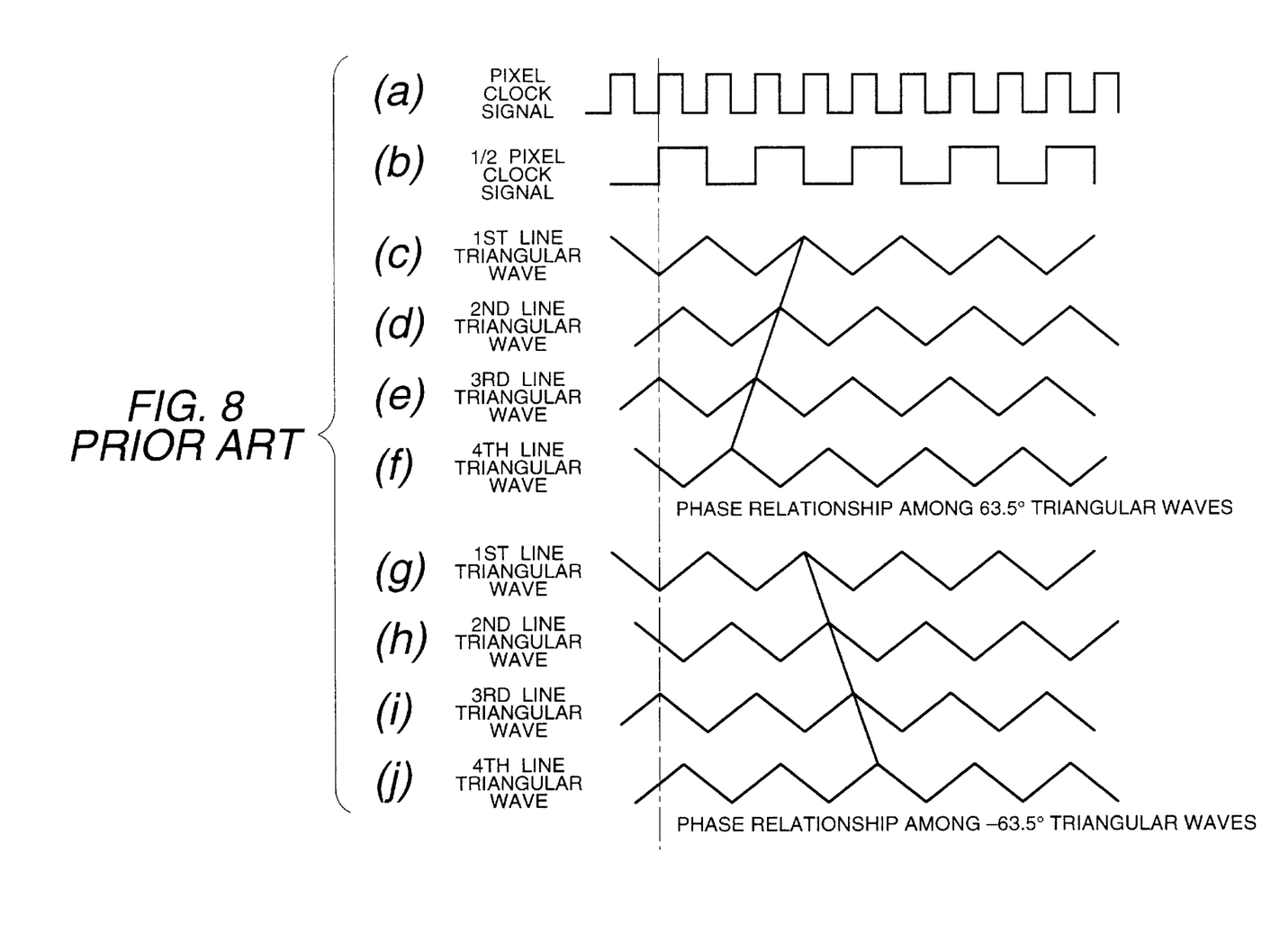
FIG. 8 is a timing chart showing a relationship between a pixel clock signal and triangular-wave signals for respective lines in cases where the screen angle is 63.5° and −63.5°.

In the example of FIG. 7, the frequency of the pixel clock (see FIG. 8(a)) is divided by a ½ frequency divider 4 to generate a dot reference clock signal (see FIG. 8(b)) whose period is twice that of the pixel clock signal. The dot reference clock signal is delayed by a delay circuit 5 by integer multiples of the ¼ period of the dot reference clock signal, to produce 4-phase clock signals $T_0$–$T_3$.

Figure 9:
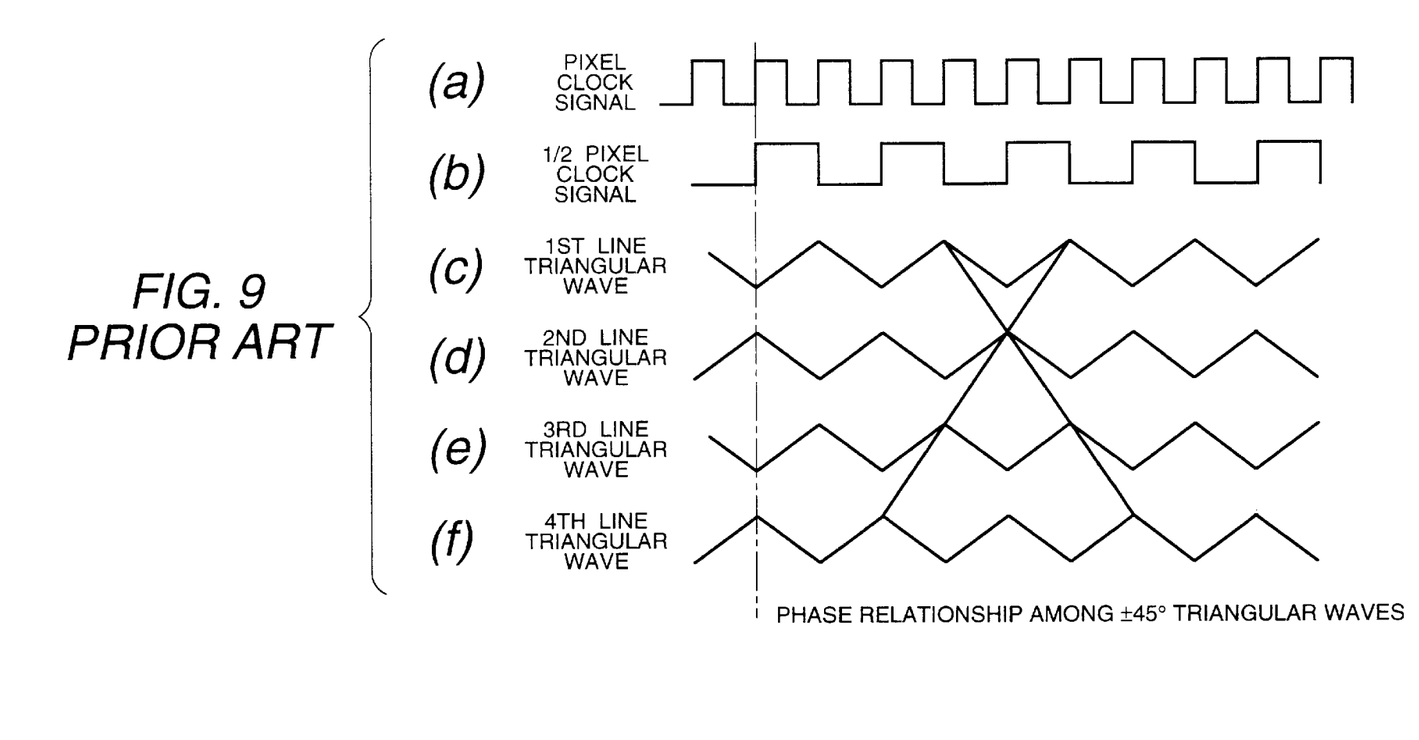
FIG. 9 is a timing chart showing a relationship between a pixel clock signal and triangular-wave signals for respective lines in cases where the screen angle is ±45°.
Figure 10A:
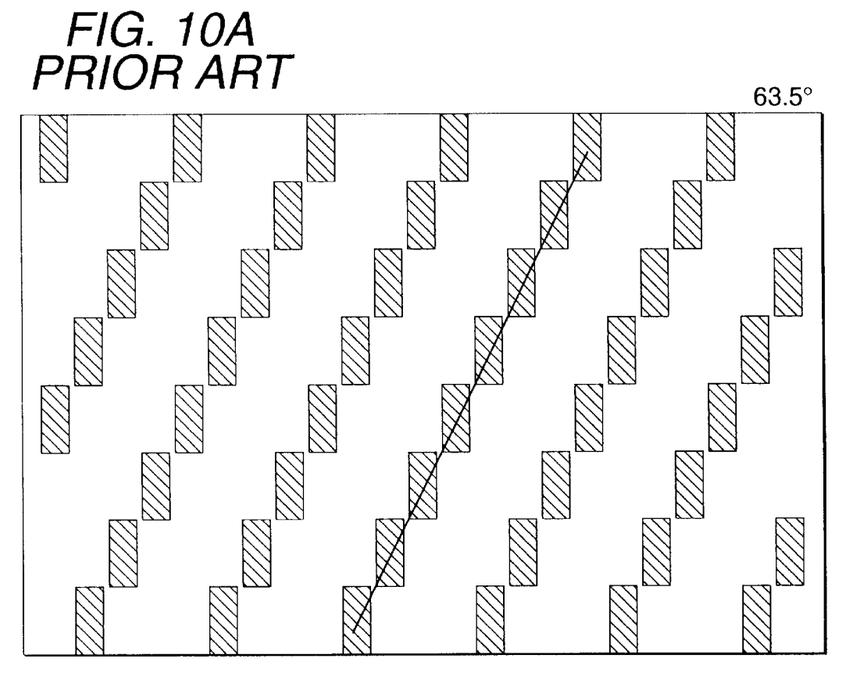
FIGS. 10A and 10B illustrate dot layouts in cases where the screen angle is 63.5° and −63.5°, respectively, in the conventional multi-color image forming apparatus.
Figure 10B:
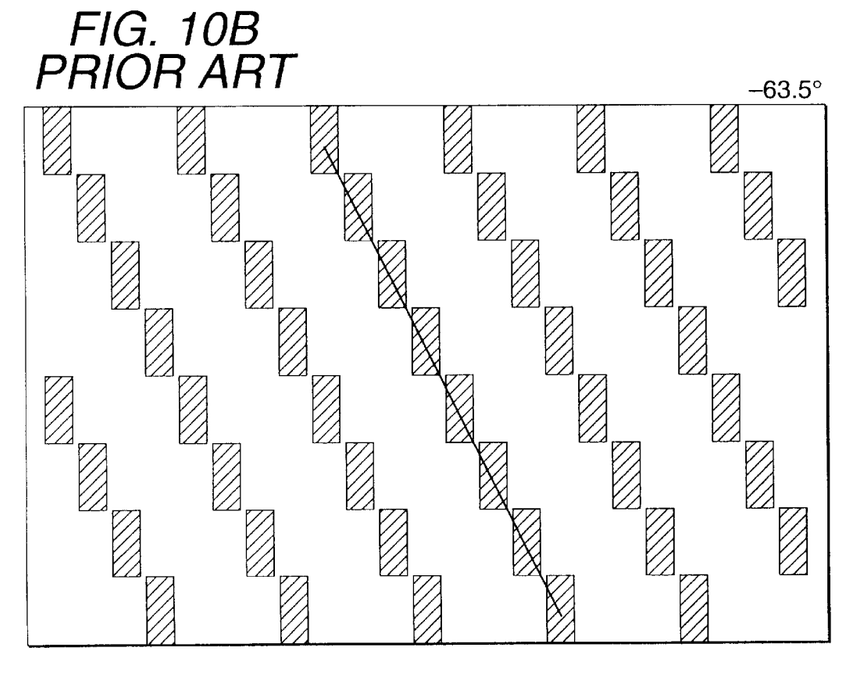
Figure 11A:
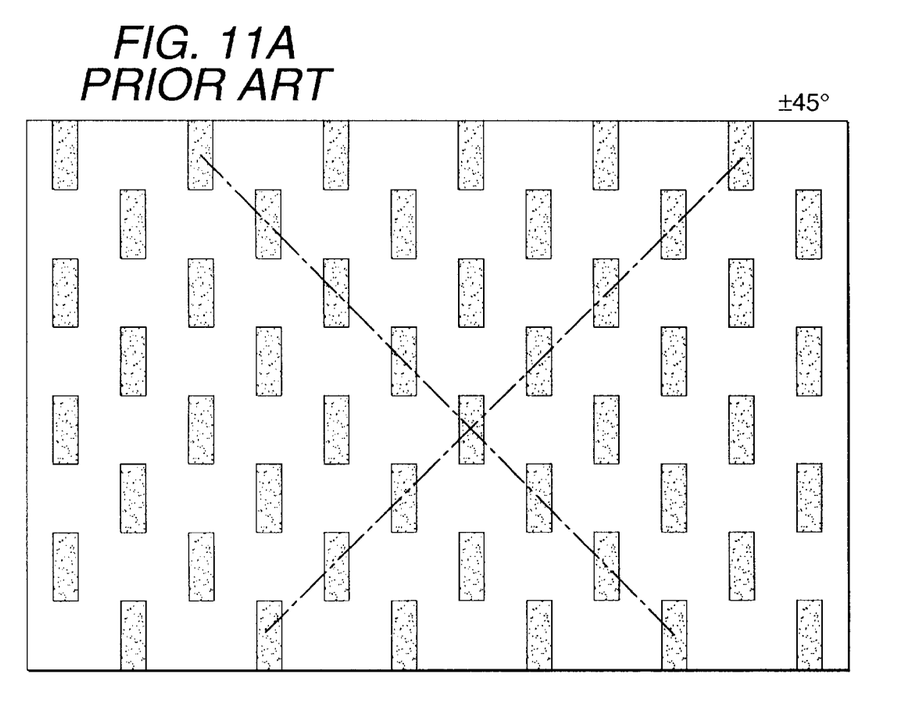
FIGS. 11A and 11B illustrate dot layouts in cases where the screen angle is ±45° and 90°, respectively, in the conventional multi-color image forming apparatus.
Figure 11B:
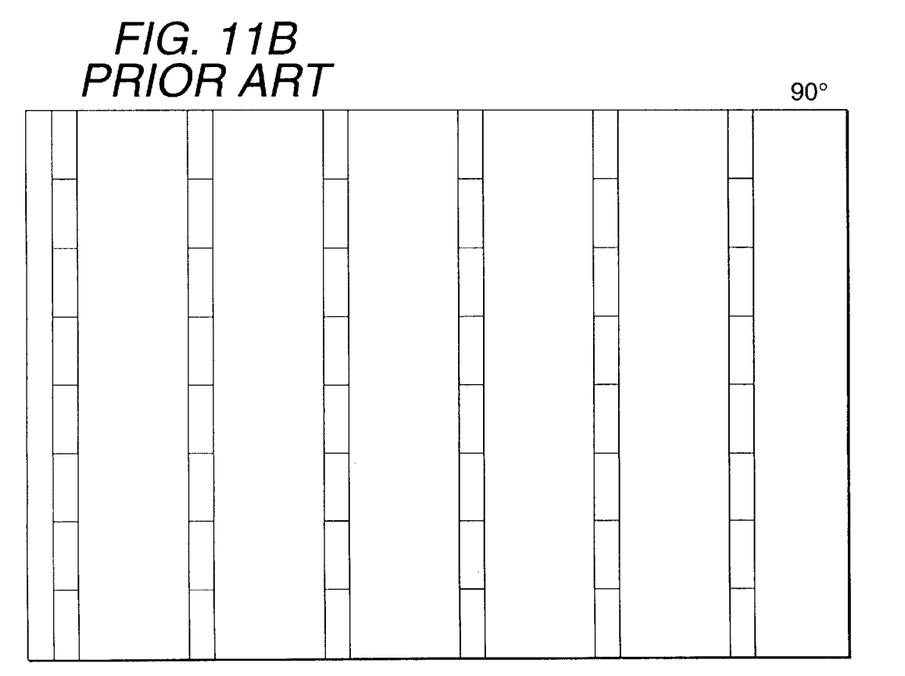

A line counter 7 starts to perform counting on a line signal when a page signal is enabled, and changes outputs $Q_1$ and $Q_0$ cyclically in the order of [0, 0], [0, 1], [1, 0] and [1, 1] at each line counting. A selector circuit 6 selects one of the 4-phase clock signals $T_0$–$T_3$ in accordance with the outputs $Q_1$ and $Q_0$ of the line counter 7 and signals Color Select-1 and Color Select-0 for discriminating among color signals, and sends a selected clock signal to the triangular-wave generator 2. In this manner, the phase of the triangular-wave signal is shifted at each scanning, to thereby form screen angles of 63.5°, −63.5° and ±45° (see FIGS. 8 and 9). In the case of 63.5° and −63.5°, the phase of the triangular-wave signal is shifted by 90° at each scanning. In the case of ±45°, the phase of the triangular-wave signal is shifted by 180° at each scanning. The screen angle is 90° when no phase shift is effected. Color images having such screen angles are so combined that the centers of the dots of the respective colors coincide with each other (see FIGS. 10A and 10B and FIGS. 11A and 11B). FIGS. 10A and 10B and FIGS. 11A and 11B show cases where the screen angle is 63.5°, −63.5°, ±45° and 90°, respectively.

Figure 12A:
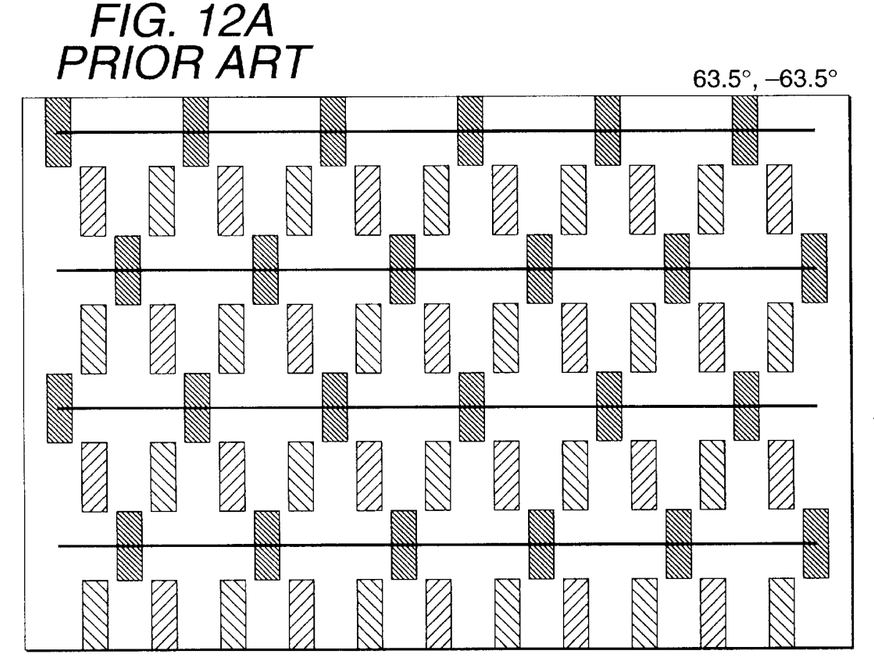
FIGS. 12A and 12B illustrate how a moiré pattern occurs in the conventional multi-color image forming apparatus.
Figure 12B:
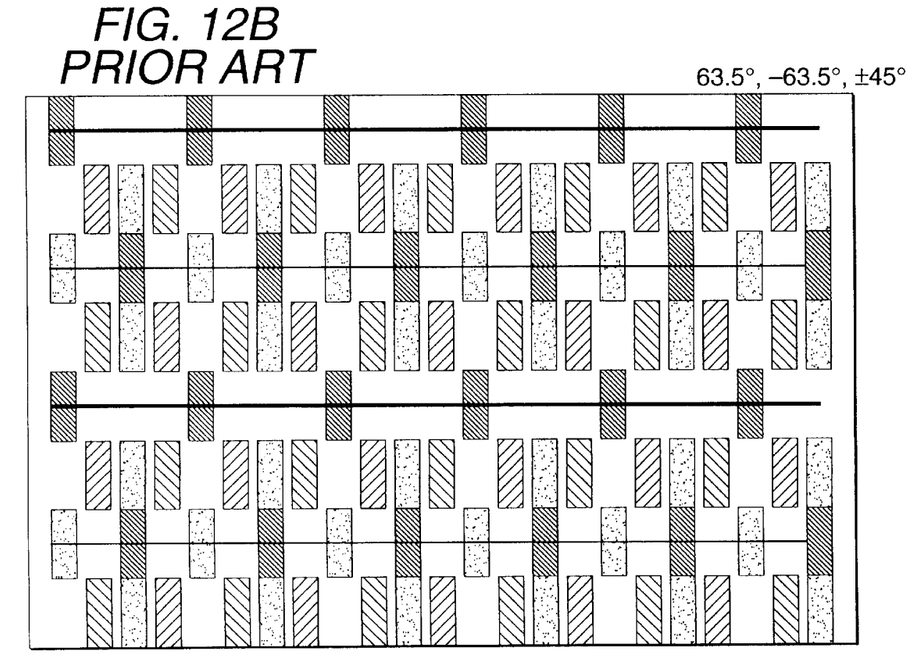

In the above conventional screen rotation technique, in which the centers of dots of the respective colors coincide with each other, a strong-contrast moiré pattern occurs at a pitch at which dots of respective superimposed color images coincide with each other as shown in FIGS. 12A and 12B. In FIGS. 12A and 12B, thick overwritten lines indicate the moiré patterns. FIG. 12A shows a case where images having screen angles of 63.5° and −63.5° are superimposed on each other. FIG. 12B shows a case where an image having a screen angle of ±45° is further superimposed on the images of FIG. 12A. In this manner, in the conventional screen rotation technique, a strong-contrast moiré pattern occurs in parallel with the main scanning direction.

Having a frequency component lower than the screen frequency, this type of moiré pattern is easily perceived visually and therefore deteriorates image quality.

SUMMARY OF THE INVENTION

An object of the present invention is to reduce the contrast of a moiré pattern that may occur due to superimposition of a plurality of screens in forming a color image by superimposing images of a plurality of colors one on another by using a screen rotation technique.

According to the invention, there is provided a multi-color image forming apparatus comprising:

means for receiving color image signals that are separated for respective colors;

means for assigning screen angles to the respective color image signals; and means for shifting phases of the color image signals to produce the respective assigned screen angles so as to cause differences among initial phases of the respective color image signals on scanning lines.

With the above constitution, the screen angles are assigned to the respective colors. To producing the respective screen angles, the phase of a reference signal is shifted, for instance, on a scanning line basis so as to cause differences among the initial phases of the respective color image signals. As a result, the centers of dots of the respective colors deviate from one another uniformly, to thereby prevent a moiré phenomenon.

BRIEF DESCRIPTION OF THE DRAWINGS

FIG. 2(a)–FIG. 2(j) are timing charts showing a relationship between a pixel clock and phase-shifted clock signals;

FIGS. 3(a)–3(d) are timing charts showing a relationship between screen angles and phases of clock signals;

DESCRIPTION OF THE PREFERRED EMBODIMENT

Figure 1:
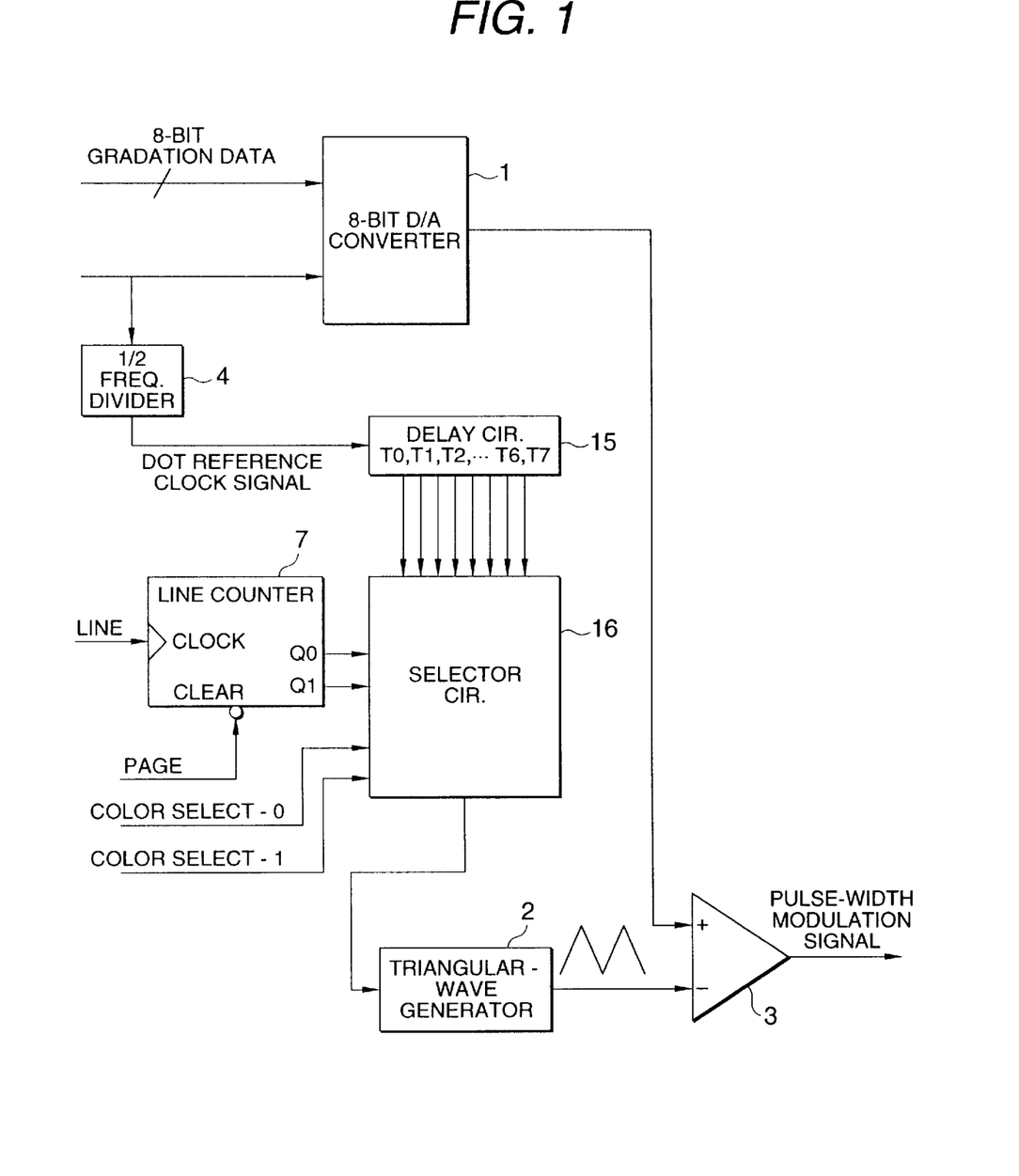
FIG. 1 is a block diagram showing a multi-color image forming apparatus according to an embodiment of the present invention.

FIG. 1 is a block diagram showing a multi-color image forming apparatus according to an embodiment of the present invention. In FIG. 1, the parts corresponding to those in FIG. 7 are given the same reference numerals.

Figure 2:
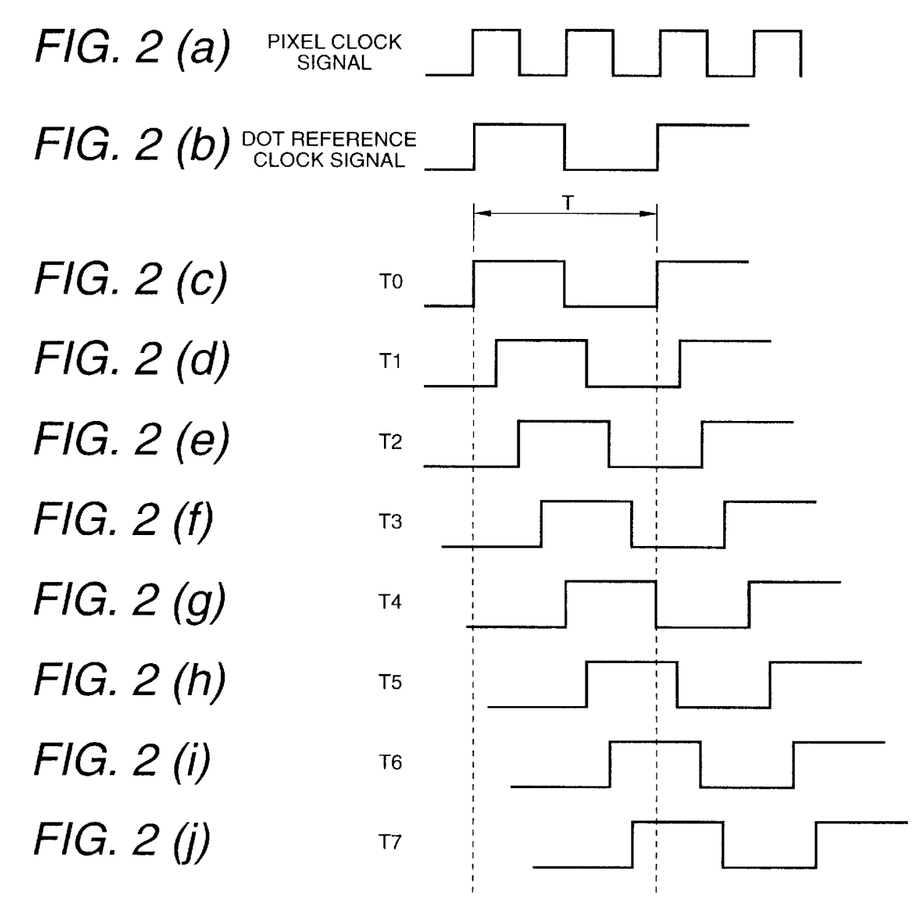

In the embodiment of FIG. 1, 8-bit digital image data is converted to an analog signal by a D/A converter 1 at clock timings of a pixel clock signal. A comparator 3 compares the resulting analog signal with a triangular-wave signal having a predetermined period that is supplied from a triangular-wave generator 2, so that a pulse-width modulation signal is generated whose width depends on the level of the analog signal. The pulse-width modulation signal serves as a dot signal to be used for generating dots. The frequency of the pixel clock (see FIG. 2(a)) is divided by a ½ frequency divider 4 to generate a dot reference clock signal (see FIG. 2(b)) whose period is twice that of the pixel clock signal.

In this embodiment, the dot reference clock signal is delayed by a delay circuit 15 by integer multiples of the ⅛ period of the dot reference clock signal, to produce 8-phase clock signals $T_0$–$T_7$ (see FIG. 2(c)–FIG. 2(j)).

A line counter 7 starts to perform counting on a line signal when a page signal is enabled, and changes outputs $Q_1$ and $Q_0$ cyclically in the order of [0, 0], [0, 1], [1, 0] and [1, 1] at each line counting. A selector circuit 16 selects one of the 8-phase clock signals $T_0$–$T_7$ in accordance with the outputs $Q_1$ and $Q_0$ of the line counter 7 and signals Color Select-1 and Color Select-0 for discriminating among color signals, and sends a selected clock signal to the triangular-wave generator 2.

Figure 3:
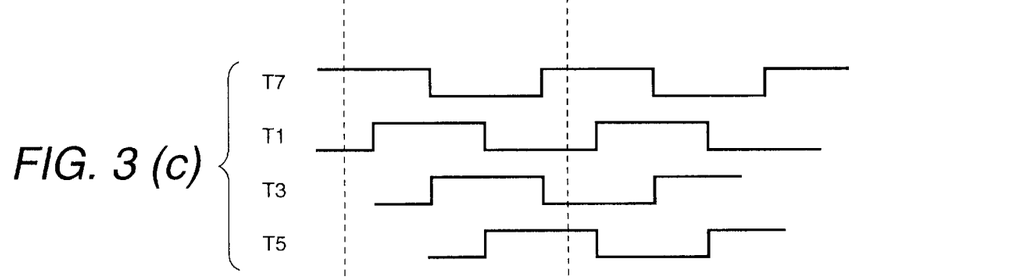
Figure 4:
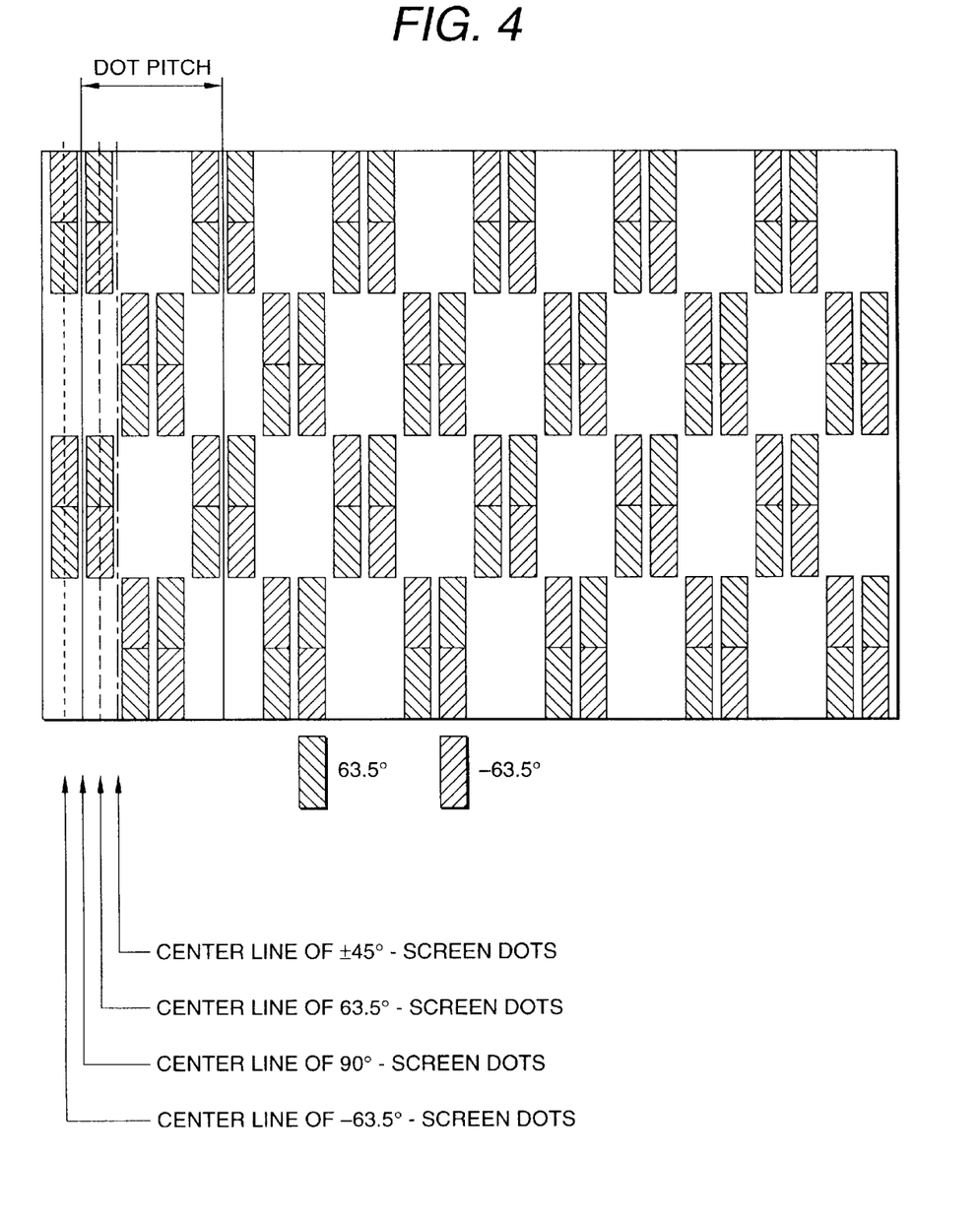
FIG. 4 illustrates a dot layout of a case where dot images having screen angles 63.5° and −63.5° are superimposed one on another in the embodiment.
Figure 5:
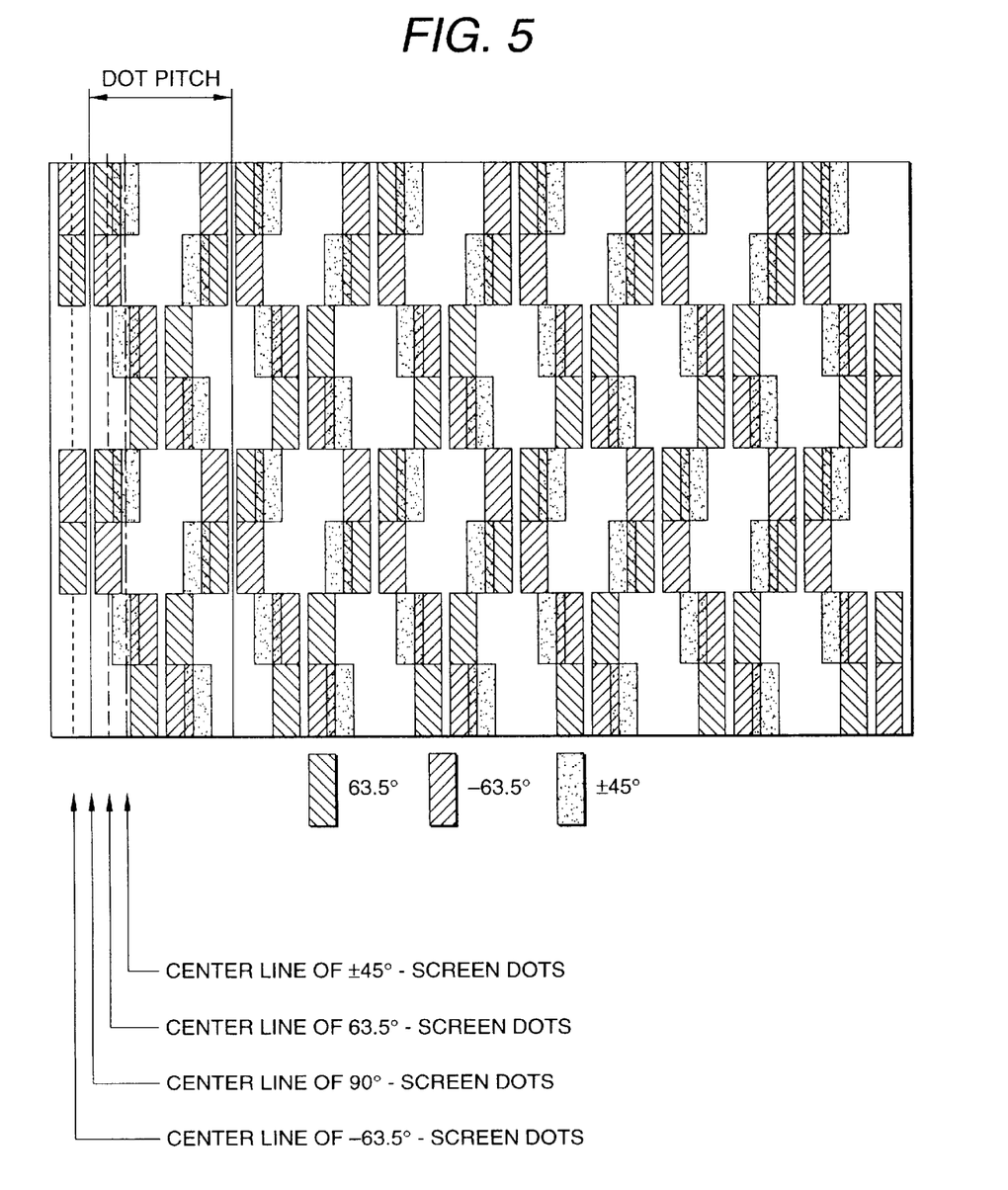
FIG. 5 illustrates a dot layout of a case where dot images having screen angles 63.5°, −63.5° and ±45° are superimposed one on another in the embodiment.
Figure 6:
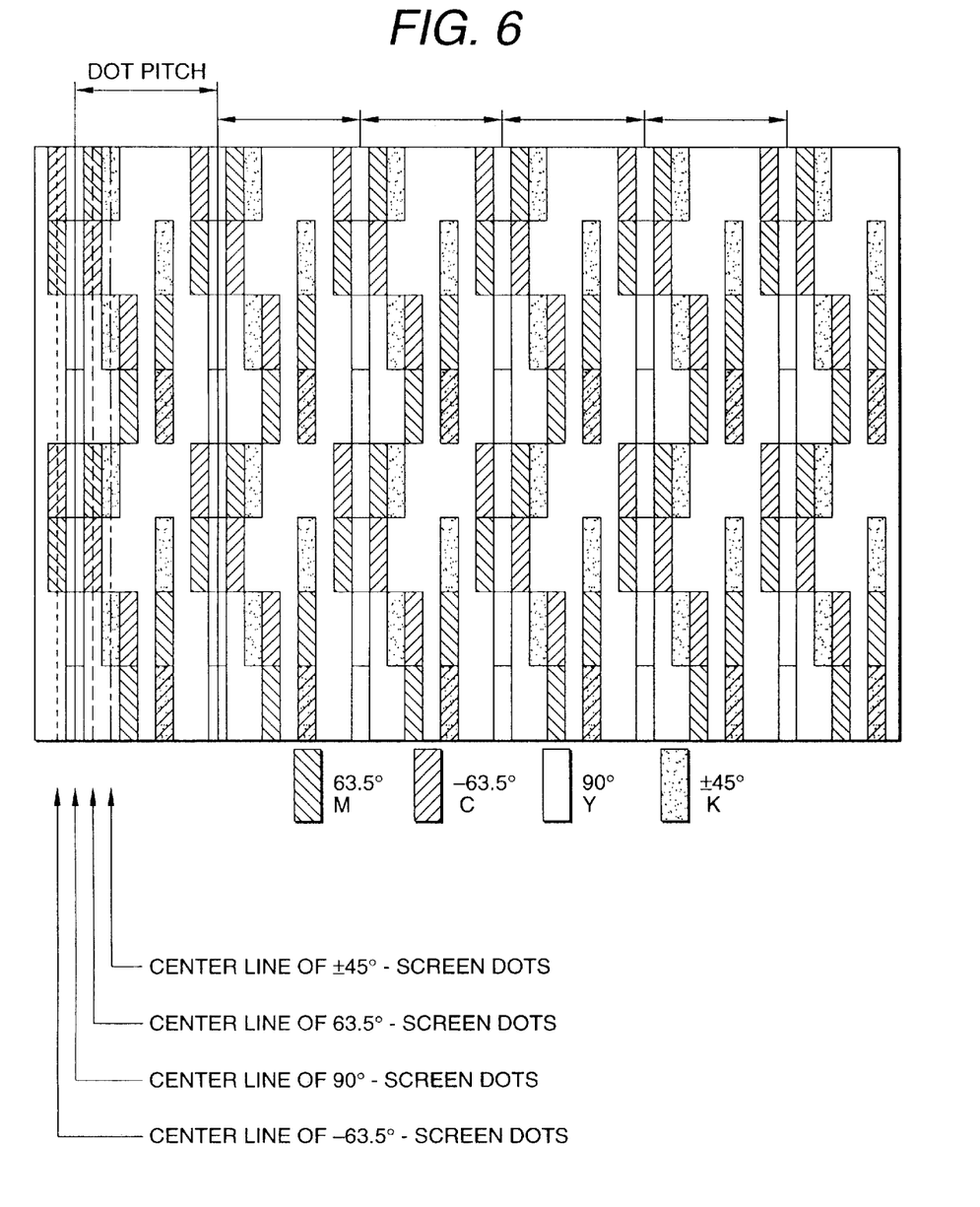
FIG. 6 illustrates a dot layout of a case where the screen angles are assigned to the respective colors so as to minimize moiré patterns of secondary and tertiary colors.

The selector circuit 16 always selects the clock signal $T_0$ for 90°-dots (see FIG. 3(a)). To produce a screen angle 63.5°, the selector circuit 16 selects the clock signals $T_1$, $T_7$, $T_5$ and $T_3$ in this order at each line counting of the line counter 7 (see FIG. 3(b)). To produce a screen angle −63.5°, the selector circuit 16 selects the clock signals $T_7$, $T_1$, $T_3$ and $T_5$ in this order (see FIG. 3(c)). To produce a screen angle of ±45°, the selector circuit 16 selects the clock signals $T_2$, $T_6$, $T_2$ and $T_6$ in this order (see FIG. 3(d)). FIG. 4 shows a case where images of two colors having screen angles 63.5° and −63.5° are superimposed on each other. FIG. 5 shows a case where images of three colors having screen angles 63.5° and −63.5° and ±45° are superimposed one on another.

According to this embodiment, in shifting the phase of he triangular-wave signal at each scanning, shift times are so set that the centers of dots of the respective colors are separated from each other uniformly. Thus, dots are not formed at the same positions, i.e., are not physically superimposed one on another. Therefore, there occurs no strong-constant moiré pattern, to thereby improve the quality of an output image.

Next, a description will be made of assigning of the screen angles to the respective colors.

In general, a color image forming apparatus reproduces a full-color image by using four colors of yellow, magenta, cyan and black, assigning different screens to the respective colors, and superimposing dot images of the respective colors one on another. In this case, moiré is remarkable in an image of a secondary color or a tertiary color which image is reproduced by combining images of yellow, magenta and cyan. While ±45° deviates from each of 63.5° and −63.5° by 18.5°, 90° deviates from each of 63.5° and −63.5° by 26.5°. In view of these facts, ±45° is assigned to black, and 90°, 63.5° and −63.5° are assigned to yellow, magenta and cyan, respectively. In this case, the screen angle lines of dot images of yellow, magenta and cyan intersect each other at relatively large angles. As a result, overlapping areas of dots of the respective colors are reduced, to thereby prevent a moiré pattern from occurring in a secondary or tertiary color image.

Further, in the above embodiment, screen structures most suitable for various images can be obtained by changing the combination of screen angles for the respective colors in accordance with the kind of image such as a photograph, a map, or a graph.

In the above embodiment, toners do not overlap with each other at all in highlight regions where toner amounts are small. Therefore, this embodiment provides an advantage that the multiple transfer can be performed stably in high-light regions that will be subjected to stricter image quality evaluation in a multiple transfer type color copier in which developed images on a photoreceptor are sequentially transferred to a sheet.

Also in an image-on-image process type color copier in which toner images are sequentially superimposed on a photoreceptor, highlight regions of secondary and tertiary colors can be reproduced stably because toners of images of the second and following colors do not overlap with a toner of an image of the preceding color.

According to the invention, in which the shift times of the dot reference clock signals are so set that the centers of dots of the respective colors are deviated from one another, dots are not formed at the same position in superposition. Therefore, occurrence of a strong-contrast moiré pattern can be prevented and therefore the quality of output images can be improved.

Further, by properly assigning the screen angles to the respective colors, the degree of a moiré pattern of a secondary or tertiary color as a combination of yellow, magenta and cyan can be minimized.

What is claimed is:

1. A multi-color image forming apparatus comprising:

means for receiving color image signals that are separated by color;

means for assigning screen angles to the respective color image signals;

means for generating clock signals having phases that deviate from one another sequentially by ⅛ of a period of a dot reference clock signals; and means for selecting one of the generated clock signals for each color on a scanning line basis so as to produce the respective assigned screen angles and to cause differences among initial phases for the respective colors.

2. The multi-color image forming apparatus of claim 1, wherein the screen angles are assigned on a page-by-page basis.

3. The multi-color image forming apparatus of claim 1, wherein the screen angles are assigned in accordance with a kind of image.

4. The multi-color image forming apparatus of claim 1, further comprising:

means for generating a triangular-wave signal based on the selected clock signal; and means for generating a phase-shifted color image signal by comparing the triangular-wave signal with the received color image signal.

5. A multi-color image forming method comprising the steps of:

receiving color image signals that are separated by color;

assigning screen angles to the respective color image signals;

generating clock signals having phases that deviate from one another sequentially by ⅛ of a period of a dot reference clock signal; and selecting one of the generated clock signals for each color on a scanning line basis so as to produce the respective assigned screen angles and to cause differences among initial phases for the respective colors.

* * * * *

UNITED STATES PATENT AND TRADEMARK OFFICE
CERTIFICATE OF CORRECTION

PATENT NO. : 6,185,014 B1
DATED : February 6, 2001
INVENTOR(S) : Akira Ishii

It is certified that error appears in the above-identified patent and that said Letters Patent is hereby corrected as shown below:

Title page,
Item [73], in the Assignee, "LTD" should read -- Ltd --.

Column 4, claim 1,
Line 60, "signals;" should read -- signal; --.

Signed and Sealed this

Fifth Day of March, 2002

Attest:

JAMES E. ROGAN
*Attesting Officer*   *Director of the United States Patent and Trademark Office*